(12) United States Patent  
Song et al.

(10) Patent No.: US 9,036,246 B2  
(45) Date of Patent: May 19, 2015

(54) 3-DIMENSIONAL IMAGE DISPLAY APPARATUS

(75) Inventors: Hoon Song, Yongin-si (KR); Hong-seok Lee, Seongnam-si (KR); Jae-hyeung Park, Suwon-si (KR)

(73) Assignees: Samsung Electronics Co., Ltd., Suwon-si (KR); Chungbuk National University Industry-Academic Cooperation Foundation, Cheongju-si (KR)

( * ) Notice: Subject to any disclaimer, the term of this patent is extended or adjusted under 35 U.S.C. 154(b) by 315 days.

(21) Appl. No.: 13/346,874

(22) Filed: Jan. 10, 2012

(65) Prior Publication Data

US 2012/0176665 A1 Jul. 12, 2012

(30) Foreign Application Priority Data

Jan. 11, 2011 (KR) ........................ 10-2011-0002868

(51) Int. Cl.  
*G02F 1/29* (2006.01)  
*G02B 27/22* (2006.01)

(52) U.S. Cl.  
CPC .................................. *G02B 27/2242* (2013.01)

(58) Field of Classification Search  
USPC ........ 359/202.1, 204.5, 211.6, 298, 290–292, 359/542, 558, 566, 641, 642, 649  
See application file for complete search history.

(56) References Cited

U.S. PATENT DOCUMENTS

| | | | |
|---|---|---|---|
| 5,802,222 A * | 9/1998 | Rasch et al. | 385/1 |
| 6,271,514 B1 * | 8/2001 | Thomas et al. | 250/234 |
| 6,341,136 B1 * | 1/2002 | Hiiro | 372/26 |
| 6,801,350 B2 * | 10/2004 | Glaser-Inbari et al. | 359/205.1 |
| 7,283,308 B2 | 10/2007 | Cossairt et al. | |
| 7,714,983 B2 * | 5/2010 | Koehler et al. | 355/67 |
| 7,909,465 B2 * | 3/2011 | Ho et al. | 351/221 |
| 7,922,339 B2 * | 4/2011 | Sokolov et al. | 353/98 |
| 8,045,244 B2 * | 10/2011 | Horikawa | 359/9 |
| 8,520,290 B2 * | 8/2013 | Ishii | 359/290 |
| 2009/0273662 A1 | 11/2009 | Lucente | |

FOREIGN PATENT DOCUMENTS

| | | |
|---|---|---|
| JP | 2002-287086 | 10/2002 |
| JP | 2005-077437 | 3/2005 |
| KR | 1020060134965 | 12/2006 |
| KR | 1020070038974 | 4/2007 |
| KR | 1020080096505 | 10/2008 |
| KR | 1020090038843 | 4/2009 |
| WO | WO 01/88598 | 11/2001 |

* cited by examiner

Primary Examiner — Tuyen Tra  
(74) Attorney, Agent, or Firm — NSIP Law

(57) ABSTRACT

Provided is a 3-dimensional (3D) display apparatus including a light source, a beam scanner, and a beam deflector array. The beam scanner scans light emitted by the light source, and the beam deflector array includes a plurality of beam deflectors arranged in an array to reproduce a light field by changing a direction of light rays scanned by the beam scanner.

15 Claims, 2 Drawing Sheets

3-DIMENSIONAL IMAGE DISPLAY APPARATUS

CROSS-REFERENCE TO RELATED APPLICATIONS

This application claims the benefit of Korean Patent Application No. 10-2011-0002868, filed on Jan. 11, 2011, in the Korean Intellectual Property Office, the disclosure of which is incorporated herein in its entirety by reference for all purposes.

BACKGROUND

1. Field

The following description relates to a 3-dimensional (3D) image display apparatus, and more particularly, to a 3D image display apparatus for displaying 3D images by applying a light field mechanism.

2. Description of the Related Art

Commercial 3D display apparatuses typically employ a mechanism in which an image depth is formed by displaying different images to each of the eyes of a viewer. However, this mechanism only provides binocular parallax information to a viewer and is unable to provide visual factors for monocular depth recognition, for example, focus adjustment and moving parallax. Therefore, a 3D image displayed according to this mechanism may present problems such as an "unnatural" image and eye fatigue.

Examples of techniques for displaying more "natural" 3D images that reduce eye fatigue include techniques for displaying 3D images by reproducing a spatio-angular distribution of light rays, that is, a light field. A light field refers to positional and directional distributions of light rays from an object. When such a light field is optically reproduced on an arbitrary plane, a viewer located behind the plane experiences substantially the same light ray distribution as a real object, and thus a "natural" 3D image of the object may be seen. Techniques for reproducing a light field include a method of using a plurality of projectors and a directional diffuser or lens, a method of using a rotating mirror and a high-speed projector, a holographic stereogram, and the like.

According to the method of using a plurality of projectors, a light field is reproduced by emitting light from the plurality of projectors in different directions to produce projected images. Thus, a relatively large number of projectors is necessary. According to the method of using a rotating mirror, a light field is reproduced by emitting light in particular directions by using a high-speed projector and rotating the rotating mirror in synchronization with the projector to produce projected images. Here, since the rotating mirror is moved mechanically, the method generally cannot be applied to a flat panel type display apparatus.

A holographic stereogram is one of a plurality of holographic 3D displays. In a holographic stereogram, a hologram is divided into hogels, and each hogel reproduces a directional distribution of light rays at a corresponding position via diffraction. Here, each hogel displays a fringe pattern for reproducing the directional distribution of light rays. Since directions of light beams are changed through diffraction in the holographic stereogram, a pixel size required on a hologram surface is too small. Furthermore, when a motion picture is displayed, fringe patterns for each hogel are newly calculated per frame, and thus the amount of required calculations is excessive. The term 'hogel' refers to a holographic pixel containing 3D depth information. A pixel is formed of a 2-dimensional (2D) image unit.

SUMMARY

Provided are examples of 3-dimensional (3D) display apparatuses for reproducing a light field, while maintaining a single pattern regardless of displayed images.

In one general aspect, there is provided a 3-dimensional (3D) display apparatus that includes a light source to generate light, a beam scanner to scan the generated light and to emit light rays, and a beam deflector array to reproduce a light field by changing a direction of each of the light rays that are incident to the beam deflector array, wherein the beam deflector array comprises a plurality of beam deflectors, and each of the beam deflectors is configured to change the direction of each of the light rays to one of a plurality of directions according to position at which each of the light rays is incident.

Each of the plurality of beam deflectors may include an array of diffraction gratings to diffract each of the light rays in the one of the plurality of different directions.

Each of the plurality of beam deflectors may include a refractor array to refract each of the light rays in the one of the plurality of different directions, wherein the refractor array comprises a plurality of refractors.

Each of the plurality of refractors may be a prism.

The light source may modulate an intensity of the generated light according to image data.

The 3D display apparatus may further include a collimator to adjust respective directions of light emitted by the beam scanner to be incident at the beam deflector array at substantially a same angle of incidence.

The beam scanner may scan the generated light with respect to a surface of the collimator.

The 3D display apparatus may further include a control unit to control the light source and the beam scanner.

The light source may generate coherent light or incoherent light.

In another general aspect, there is provided a method of guiding light, including generating the light from a light source, diverging the light in a plurality of first light directions, and diffracting or refracting the diverged light in a plurality of second light directions.

A 3D display apparatus according to the examples described herein may include an array of beam deflectors, formed by an optical structure, for changing a direction of light according to position at which the light is incident to each of the beam deflectors. Accordingly, desired light rays may be reproduced by irradiating light with modulated intensity to a particular position of the beam deflectors.

Therefore, unlike in a holographic stereogram, it is not necessary to newly calculate elements, such as fringe patterns, for each frame. Further, a light field may be reproduced by maintaining a pattern of beam deflectors, which are passive devices, regardless of the images displayed.

Since 3D display apparatuses according to the examples described herein are based on light field reproduction, the 3D display apparatuses may display more "natural" 3D images, and may help reduce eye fatigue.

Other features and aspects may be apparent from the following detailed description, the drawings, and the claims.

Figure 1:
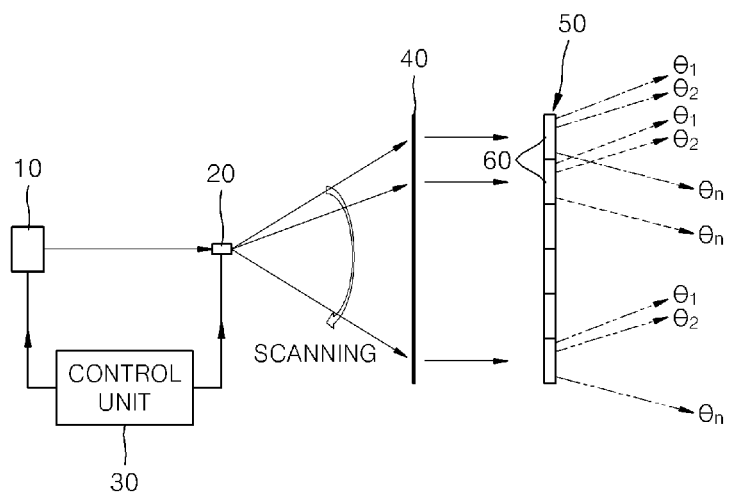
FIG. 1 is a diagram illustrating an example of a 3D display apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining an understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

3-dimensional (3D) display apparatuses according to the examples described herein are provided to resolve problems related to existing 3D display apparatuses that are based on light field reproduction. 3D display apparatuses according to the examples described herein have similar configurations as a holographic stereogram, and thus a plurality of projectors or mechanical movement is not necessary. Furthermore, unlike in a holographic stereogram, 3D display apparatuses according to the examples described herein do not need a new calculation of fringe patterns for each frame. That is, 3D display apparatuses according to the examples described herein may maintain a single pattern regardless of display images. Therefore, 3D display apparatuses according to the examples described herein typically apply a relatively small amount of calculations and may include a component corresponding to a hogel that is configured by a passive device.

Hereinafter, 3D display apparatuses according to the examples described herein are described detail.

FIG. 1 illustrates an example of a 3D display apparatus.

Referring to FIG. 1, a 3D display apparatus according to one example includes a light source 10, a beam scanner 20 for scanning a light emitted by the light source 10, and a beam deflector array 50, in which a plurality of beam deflectors 60 are arranged in an array to reproduce a light field by changing direction of a light beam scanned by the beam scanner 20. The light source 10 and the beam scanner 20 may be controlled by a control unit 30. Each of the beam deflectors 60 of the beam defector array 50 corresponds to a single hogel in a holographic stereogram. A 3D display apparatus according to one example may further include a collimator 40. The collimator 40 may be omitted according to design conditions of the beam deflector array 50.

The light source 10 emits light beam with intensities modulated according to image data; the image data may be provided by the control unit 30. The light source 10 may emit coherent light or incoherent light. A laser light source, such as a semiconductor laser emitting coherent light, or an incoherent light source, such as a light emitting diode emitting incoherent light, may be implemented as the light source 10.

The beam scanner 20 may be arranged to scan the light beam emitted by the light source 10, with respect to a surface of the collimator 40. As illustrated in FIG. 1, a group of light rays, once scanned by the beam scanner 20, corresponds to a diverged light beam having a predetermined divergence angle with an emission point on the beam scanner 20. The diverged light beam is collimated to a parallel light beam by the collimator 40. Therefore, light rays scanned by the beam scanner 20 are incident to the beam deflector array 50 at a substantially same angle of incidence regardless of position by the collimator 40 (FIG. 1 shows an example of vertical incidence of light beams). Hereinafter, it is considered that the term 'same angle of incidence' includes similar angles of incidence in consideration of a collimation limit of the collimator 40.

In the example of a 3D display apparatus that does not include a collimator 40, the beam scanner 20 may be arranged to scan the light rays emitted by the light source 10 with respect to a surface of the beam deflector array 50. In this example, the light rays scanned by the beam scanner 20 are incident to the surface of the beam deflector array 50 at different angles of incidence, according to position. A group of light rays, once scanned by the beam scanner 20, correspond to a diverged light beam having a predetermined divergence angle with an emission point on the beam scanner 20. Therefore, angles at which light rays are incident to the surface of the beam deflector array 50 change according to position. A light field produced in the example where the beam deflector array 50 is designed in consideration of the angles of incidence of light rays may be similar to a light field produced in the example where the collimator 40 is arranged and light rays are incident to the beam deflector array 50 at a same angle of incidence regardless of position.

The beam scanner 20 scans the light emitted from the light source 10, such that the light is sequentially irradiated to each of the beam deflectors 60 of the beam deflector array 50. The beam scanner 20 may also be controlled by the control unit 30 to change the directions of the light rays. The beam scanner 20 may scan light rays throughout the entire beam deflector array 50, and a single frame 3D image may be displayed per scanning operation. In a further example, the beam scanner 20 may scan light rays with respect to only a portion of the beam deflector array 50.

The collimator 40 enables light scanned by the beam scanner 20 to be incident at a same angle of incidence regardless of position to the beam deflector array 50. As described above, in the example where the beam deflector array 50 is designed to be suitable for light rays scanned by the beam scanner 20 and incident at different angles according to position, the collimator 40 may be omitted.

The beam deflector array 50 is an arrangement of the beam deflectors 60 for changing a direction of light to various directions. Each of the beam deflectors 60 may be formed by an optical structure for changing a direction of light to a plurality of directions according to a position at which light is incident thereto.

Figure 2:
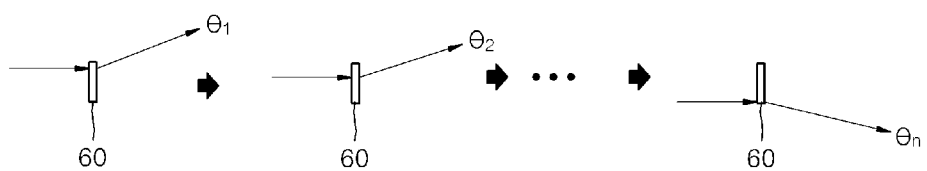
FIG. 2 is a series of diagrams illustrating examples of change in direction of light according to incidence position of a light ray upon one of beam deflectors of a beam deflector array.

FIG. 2 illustrates change in direction of light according to incidence position of a light ray upon a beam deflector, such as one of the beam deflectors 60 of the beam deflector array 50.

Referring to FIG. 2, when a light ray is scanned by the beam scanner 20 with respect to a surface of the beam deflector array 50, a position at which a light ray is incident to the beam deflector 60 is sequentially changed. Accordingly, each of the beam deflectors 60 included in the beam deflector array 50 may be configured such that light rays travel in different directions according to respective positions at which the light rays are incident to each of the beam deflectors 60. FIGS. 1 and 2 illustrate examples in which, when positions at which light rays are vertically incident to each of the beam deflectors 60 are sequentially changed, the light rays travel in directions according to angles $\theta_1, \theta_2, \ldots,$ and $\theta_n$.

Here, in the example of a 3D display apparatus that includes the collimator 40, light rays are scanned by the beam scanner 20 with respect to a surface of the beam deflector array 50. Therefore, scanning light rays with respect to a surface of the beam deflector array 50 are applied to both the example including the collimator 40 and the example that does not include the collimator 40.

Figure 3:
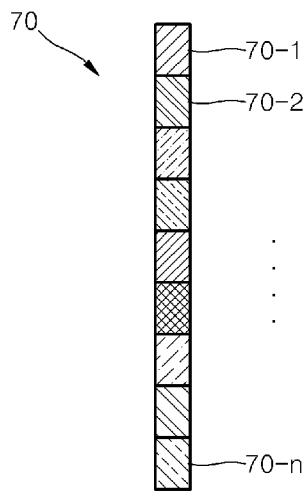
FIGS. 3 and 4 are diagrams illustrating examples of the beam deflectors.
Figure 4:
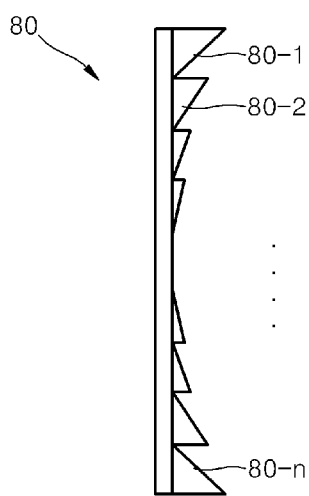

Each of the beam deflectors 60 of the beam deflector array 50 may be configured as shown in the examples of FIGS. 3 and 4. Accordingly, FIGS. 3 and 4 illustrate examples of beam deflectors, such as the beam deflectors 60 of the beam deflector array 50 of FIG. 1.

Referring to FIG. 3, a beam deflector 70 may include diffraction grating arrays 70-1, 70-2, . . . , and 70-n for diffracting incident light in different directions. For example, the beam deflector 70 may include a diffraction grating 70-1 for diffracting incident light at an angle $\theta_1$ a diffraction grating 70-2 for diffracting incident light at an angle $\theta_2$, . . . , and a diffraction grating 70-n for diffracting incident light at an angle $\theta_n$.

Therefore, one example of the beam deflector array 50 includes an array of the beam deflectors 70, each of the beam deflectors 70 having the diffraction gratings 70-1, 70-2, . . . , and 70-n as a beam deflector. Accordingly, light incident to each of the beam deflectors 60 of the beam deflector array 50 may be diffracted to diffraction angles $\theta_1$, $\theta_2$, . . . , and $\theta_n$, according to position at which the light is incident to each of the beam deflectors 60.

Referring to FIG. 4, a beam deflector 80 may include refractor arrays 80-1, 80-2, . . . , and 80-n for refracting incident light beams in different directions. For example, to refract incident light at refraction angles $\theta_1$, $\theta_2$, . . . , and $\theta_n$, the beam deflector 80 may include a refractor 80-1 for refracting incident light at an angle $\theta_1$, a refractor 80-2 for refracting incident light at an angle $\theta_2$, . . . , and a refractor 80-n for refracting incident light at an angle $\theta_n$. FIG. 4 shows an example in which the refractors 80-1, 80-2, . . . , and 80-n are prisms. Thus, as shown in FIG. 4, the beam deflector 80 may be implemented as a prism array. Therefore, one example of the beam deflector array 50 includes the array of the beam deflectors 80, each having the refractor arrays 80-1, 80-2, . . . , and 80-n as described above. Accordingly, light incident to each of the beam deflectors 60 may be refracted at refraction angles $\theta_1$, $\theta_2$, . . . , and $\theta_n$ according to position at which the light is incident.

As described above, a 3D image may be displayed by controlling the beam scanner 20 to scan light rays with respect to a surface of the beam deflector array 50. The beam scanner 20 may scan light throughout the entire beam deflector array 50, and a single frame 3D image is displayed per scanning operation. In a further example, the beam scanner 20 may scan light rays with respect to only a portion of the beam deflector array 50.

In the holographic stereogram, each hogel receives substantially parallel uniform light and reproduces a directional intensity distribution of light rays at a corresponding position. In other words, the hogels alter a direction of a light ray and may modulate an intensity of the light ray simultaneously via fringe patterns.

However, in 3D display apparatuses according to certain examples described herein, intensity of light is modulated by the light source 10, and each of the beam deflectors 60 may receive light with intensity already modulated. Accordingly, the beam deflectors 60 deflect the light in direction forming angles $\theta_1$, $\theta_2$, . . . , and $\theta_n$ with respect to the direction in which the light is incident to the corresponding beam deflector 60, according to positions at which the light is incident during a scanning operation.

As described above, the beam deflector 60 includes an optical structure for changing a direction of light according to position at which the light is incident to the beam deflector 60. Thus, a desired light ray may be reproduced by irradiating light with modulated intensity to a particular position of the beam deflector 60.

Therefore, unlike a hogel in a general holographic stereogram, it is not necessary to change the beam deflector 60 per frame of a motion picture in the examples described herein. Thus, light field reproduction type 3D image display apparatuses may be adapted to include the beam deflector array 50 by employing passive devices, such as diffraction gratings, prisms, and the like, as described above.

Since 3D display apparatuses according to the examples described herein are based on light field reproduction, the 3D display apparatuses may display more "natural" 3D images, and may help reduce eye fatigue. Furthermore, compared to other methods based on light field reproduction, 3D display apparatuses according to the examples described herein do not need a plurality of projectors, significant mechanical movement, or a super high-resolution panel, as is required for a typical holographic stereogram.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A 3-dimensional (3D) display apparatus comprising:
   a light source to generate light;
   a beam scanner to scan the generated light and to emit light rays; and
   a beam deflector array to reproduce a light field by changing a direction of each of the light rays that are incident to the beam deflector array,
   wherein the beam deflector array comprises a plurality of beam deflectors, and each of the beam deflectors comprises an array of a plurality of elements to change the direction of each of the light rays to one of a plurality of directions according to a position at which each of the light rays is incident.

2. The 3D display apparatus of claim 1, wherein each of the plurality of beam deflectors comprises an array of diffraction gratings to diffract each of the light rays in the one of the plurality of different directions.

3. The 3D display apparatus of claim 2, further comprising a collimator to adjust respective directions of light emitted by the beam scanner to be incident at the beam deflector array at substantially a same angle of incidence.

4. The 3D display apparatus of claim 1, wherein each of the plurality of beam deflectors comprises a refractor array to refract each of the light rays in the one of the plurality of different directions,
   wherein the refractor array comprises a plurality of refractors.

5. The 3D display apparatus of claim 4, wherein each of the plurality of refractors comprises a prism.

6. The 3D display apparatus of claim 4, further comprising a collimator to adjust respective directions of the light rays emitted by the beam scanner to be incident at the beam deflector array at substantially a same angle of incidence.

7. The 3D display apparatus of claim 1, wherein the light source modulates an intensity of the generated light according to image data.

8. The 3D display apparatus of claim 7, further comprising a collimator to adjust respective directions of light emitted by the beam scanner to be incident at the beam deflector array at substantially a same angle of incidence.

9. The 3D display apparatus of claim 8, wherein the beam scanner scans the generated light with respect to a surface of the collimator.

10. The 3D display apparatus of claim 7, further comprising a control unit to control the light source and the beam scanner.

11. The 3D display apparatus of claim 1, further comprising a collimator to adjust respective directions of light emitted by the beam scanner to be incident at the beam deflector array at substantially a same angle of incidence.

12. The 3D display apparatus of claim 1, wherein the light source generates coherent light.

13. The 3D display apparatus of claim 1, wherein the light source generates incoherent light.

14. The 3D display apparatus of claim 1, wherein each of the beam deflectors of the beam deflector array corresponds to a single hogel in a holographic stereogram.

15. A 3-dimensional (3D) display apparatus comprising:
a light source to generate light;
a beam scanner to scan the generated light and to emit light rays; and
a beam deflector array to reproduce a light field by changing a direction of each of the light rays that are incident to the beam deflector array, wherein
the beam deflector array comprises a plurality of beam deflectors, and each of the beam deflectors is configured to change the direction of each of the light rays to one of a plurality of directions according to a position at which each of the light rays is incident; and
each of the beam deflectors of the beam deflector array corresponds to a single hogel in a holographic stereogram.

* * * * *